J. D. LAWRENCE.
COUNTERBALANCE MECHANISM FOR VEHICLE WINDOWS.
APPLICATION FILED SEPT. 27, 1920.
1,397,256.
Patented Nov. 15, 1921.
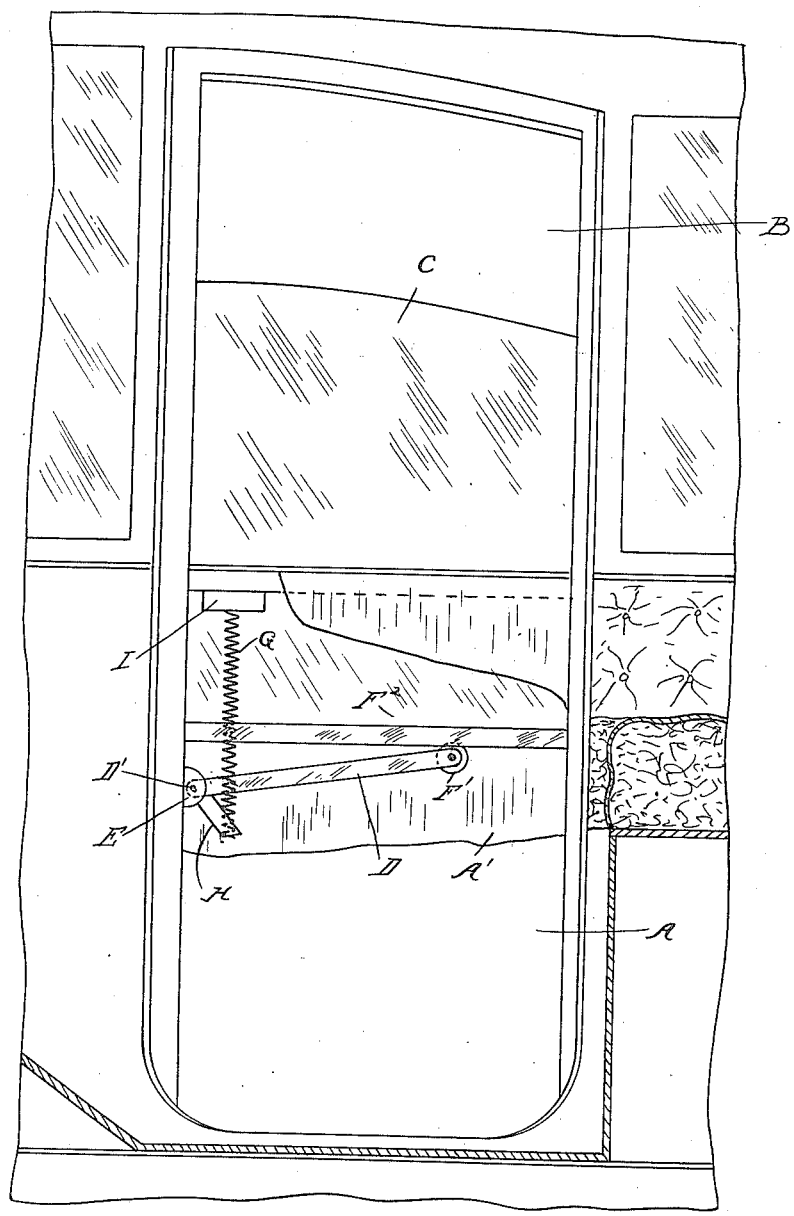
Inventor
John D. Lawrence
By Whittemore Hulbert & Whittemore
Attorneys

UNITED STATES PATENT OFFICE.

JOHN D. LAWRENCE, OF TOLEDO, OHIO, ASSIGNOR TO DURA MECHANICAL HARDWARE COMPANY, OF TOLEDO, OHIO, A CORPORATION OF OHIO.

COUNTERBALANCE MECHANISM FOR VEHICLE-WINDOWS.

1,397,256.   Specification of Letters Patent.   Patented Nov. 15, 1921.

Application filed September 27, 1920. Serial No. 413,014.

*To all whom it may concern:*

Be it known that I, JOHN D. LAWRENCE, a citizen of the United States of America, residing at Toledo, in the State of Ohio, have invented certain new and useful Improvements in Counterbalance Mechanism for Vehicle-Windows, of which the following is a specification, reference being had therein to the accompanying drawings.

This invention relates to counterbalance mechanisms for vehicle windows and more particularly for the windows of motor vehicles.

The invention consists in the structural features and arrangement of parts hereinafter fully set forth.

The drawing comprises an interior view of an automobile door provided with a window and with the herein described counterbalance mechanism for said window.

In this view A designates a motor vehicle door having a chambered lower portion indicated at A′ and provided with a window opening B in its upper portion. A plate of glass C forms a sliding closure for said opening, said plate entering the chambered lower portion of the door when lowered. Within said chambered portion there is disposed a counterbalance mechanism comprising an arm D, one end of which is pivoted at D′ upon a bracket E secured to one of the side pieces of the door, while the other, or free end of said arm carries a roller F′ engaging a strip F² secured to the bottom edge of the glass C. Said arm is acted upon by a counterbalance spring G, which preferably has the form of a vertically extending coil, the lower end of which is attached to a short arm H formed integral with the arm D at the pivotal end thereof and projecting downwardly at an acute angle to said arm. The upper end of said spring is anchored to a bracket I mounted in the upper portion of the chamber A′.

By thus attaching the counterbalance spring G to an arm H inclined downwardly at an acute angle from the arm D, the desired location of said spring in proximity to the side piece F is secured and a greater leverage is afforded the spring in acting upon the arm D than would result from a direct connection of a spring having the same location to said arm.

What I claim as my invention is:

1. A counterbalance mechanism for a vertically slidable window member comprising a pivotal main arm adapted to bear upwardly upon said window member, a relatively short arm projecting at an acute angle from the pivotal end of the main arm, and a counterbalance spring secured to said short arm and extending upwardly to a suitable anchorage point.

2. A counterbalance mechanism for a vertically slidable window member, comprising a pivotal main arm adapted to bear upwardly upon said sliding member, a relatively short arm formed as a return bent portion of the pivoted end of said main arm and extending downwardy at an acute angle to said main arm, and a spring acting upwardly upon said short arm.

In testimony whereof I affix my signature.

JOHN D. LAWRENCE.